United States Patent
Seifried et al.

(10) Patent No.: US 10,721,852 B2
(45) Date of Patent: Jul. 28, 2020

(54) CULTIVATOR WHICH IS SCREWED ON THE REAR FACE

(71) Applicant: Betek GmbH & Co. KG, Aichhalden (DE)

(72) Inventors: Fabian Seifried, Herrenzimmern (DE); Uwe Schneider, Rottweil (DE); Stefan Ruggaber, Fluorn-Winzeln (DE); Wolfgang Essig, Rosenfeld (DE)

(73) Assignee: Betek GmbH & Co. KG, Aichhalden (DE)

( * ) Notice: Subject to any disclaimer, the term of this patent is extended or adjusted under 35 U.S.C. 154(b) by 0 days.

(21) Appl. No.: 15/962,171

(22) Filed: Apr. 25, 2018

(65) Prior Publication Data

US 2018/0235137 A1  Aug. 23, 2018

Related U.S. Application Data

(63) Continuation of application No. PCT/EP2017/068247, filed on Jul. 19, 2017.

(30) Foreign Application Priority Data

Aug. 18, 2016  (DE) .......................... 10 2016 115 323

(51) Int. Cl.
*A01B 15/02* (2006.01)
*A01B 15/06* (2006.01)
(Continued)

(52) U.S. Cl.
CPC .............. *A01B 15/06* (2013.01); *A01B 15/02* (2013.01); *A01B 23/02* (2013.01); *A01B 39/22* (2013.01); *F16B 2037/007* (2013.01)

(58) Field of Classification Search
CPC ......... A01B 15/02; A01B 15/10; A01B 39/22; F16B 2037/007
(Continued)

(56) References Cited

U.S. PATENT DOCUMENTS

| 223,309 | A | * | 1/1880 | Beebe | ................... | A01B 15/06 |
| | | | | | | 172/753 |
| 525,867 | A | * | 9/1894 | Smith | ................... | A01B 35/26 |
| | | | | | | 172/740 |

(Continued)

FOREIGN PATENT DOCUMENTS

| DE | 10 2013 102 420 A1 | 9/2014 |
| DE | 10 2014 116 619 A1 | 5/2016 |

(Continued)

OTHER PUBLICATIONS

International Search Report and Written Opinion (Application No. PCT/EP2017/068247) dated Dec. 1, 2017.
(Continued)

*Primary Examiner* — Gary S Hartmann
(74) *Attorney, Agent, or Firm* — Burr & Brown, PLLC

(57) ABSTRACT

A cultivator for an agricultural soil processing machine, which includes a base part which has a cutting element on a cutter support. The base part has at least one screw receiving area for securing to a support, in particular a tine of the agricultural soil processing machine. The screw receiving area is designed as a blind hole with an inner thread and is recessed into a cultivator support surface aligned opposite the tool advancing direction of the cultivator, or the screw receiving area is designed as a through-bore with an inner thread and is covered by at least one wear protection element in the tool advancing direction.

17 Claims, 3 Drawing Sheets

(51) Int. Cl.
*A01B 23/02* (2006.01)
*A01B 39/22* (2006.01)
*F16B 37/00* (2006.01)

(58) Field of Classification Search
USPC ......... 172/684.5, 701.3, 749, 753, 762, 763, 172/769, 772.5; 37/266, 407
See application file for complete search history.

(56) References Cited

U.S. PATENT DOCUMENTS

| | | | | |
|---|---|---|---|---|
| 813,988 | A * | 2/1906 | McManmon | F16B 11/006 403/375 |
| 924,583 | A * | 6/1909 | Rosencranz | A01B 15/06 172/753 |
| 2,212,147 | A * | 8/1940 | Bittner | A01B 15/06 172/749 |
| 2,312,371 | A * | 3/1943 | Strandlund | A01B 15/02 172/737 |
| 2,312,372 | A * | 3/1943 | Strandlund | A01B 15/02 172/737 |
| 4,799,823 | A * | 1/1989 | Williams | A01B 13/08 172/719 |
| 5,119,888 | A | 6/1992 | Hall | |
| 6,289,996 | B1 | 9/2001 | Parish | |
| 8,205,362 | B2 * | 6/2012 | Yeomans | E02F 9/2825 172/699 |
| 2016/0014950 | A1 | 1/2016 | Smeets | |
| 2017/0367248 | A1 | 12/2017 | Essig et al. | |

FOREIGN PATENT DOCUMENTS

| | | |
|---|---|---|
| EP | 2 959 758 A1 | 12/2015 |
| FR | 2 603 151 A1 | 3/1988 |
| FR | 2 754 131 A1 | 4/1998 |

OTHER PUBLICATIONS

Canadian Office Action, Canadian Application No. 2,999,218, dated Feb. 5, 2019 (8 pages).

* cited by examiner

CULTIVATOR WHICH IS SCREWED ON THE REAR FACE

CROSS REFERENCE TO RELATED APPLICATIONS

This application is a continuation of International Application No. PCT/EP2017/068247 filed Jul. 19, 2017, which designated the United States, and claims the benefit under 35 USC § 119(a)-(d) of German Application No. 10 2016 115 323.0 filed Aug. 18, 2016, the entireties of which are incorporated herein by reference.

FIELD OF THE INVENTION

The present invention relates to a cultivator for an agricultural soil processing machine, comprising a base part which has a cutting element on a cutter support, wherein the base part has at least one screw receiving area for securing to a support, in particular a tine of the agricultural soil processing machine.

The present invention further relates to a tool system for an agricultural soil processing machine comprising a cultivator and a support, in particular a tine of the agricultural soil processing machine, wherein the cultivator comprises a base part which has a cutting element arranged on a cutter support, and wherein the base part comprises at least one screw receiving area and the support has at least one mounting bore for fastening the cultivator to the support.

BACKGROUND OF THE INVENTION

Such a cultivator and such a tool system are disclosed in DE 10 2013 102 420 A1. A share tip shown therein and an adjoining guide element are connected by means of screw connections to a tine of an agricultural soil processing machine. The share tip has a base part with a cutter support facing in the working direction, cutting elements in the form of hard metal elements being fastened thereto. Hard material elements adjacent to the cutting elements cover a part of the surface of the base part facing in the working direction. The base part is penetrated by a screw receiving area. The tine has a bore corresponding thereto. A screw may be inserted through the screw receiving area and the bore and secured on the rear face by a nut. In this manner the share tip is connected to the tine. The screw head of the screw faces in the working direction of the cultivator. In order to reduce the wear of the screw head, the screw head is arranged so as to be countersunk in the base part. A deflector is arranged in the working direction upstream of the screw receiving area, the deflector conducting removed soil material past the screw receiving area. However, it is not possible to prevent earth from penetrating as far as the screw head into the screw receiving area. This leads to wear of the screw head. Moreover, the access to the screw head is blocked by the earth. In order to release the screw, this earth initially has to be removed before a suitable tool is able to be inserted into the tool receiver of the screw head provided therefor. Stones may also become jammed in the screw receiving area above the screw head, which makes access to the screw more difficult. The disclosed base part has a receiver facing the guide element, a plug-in attachment of the guide element being inserted therein. The plug-in attachment is also penetrated by a screw receiving area, a screw being guided through the screw receiving area for connecting the guide element to the tine. The receiver covers the plug-in attachment and thus the screw receiving area in the working direction of the combined tool. As a result, the screw is protected from wear.

SUMMARY OF THE INVENTION

It is the object of the present invention to provide a cultivator which permits a releasable connection to a support which is wear-resistant and easily accessible. It is a further object of the present invention to provide a corresponding tool system.

The object of the present invention is achieved by the screw receiving area being designed as a blind hole with an inner thread and being recessed into a support surface of the cultivator which is aligned opposite the tool advancing direction (V) of the cultivator or by the screw receiving area being designed as a through-bore with an inner thread and being covered by at least one wear protection element in the tool advancing direction (V). The screw receiving area is, therefore, only accessible counter to the tool advancing direction (V). In the tool advancing direction (V), the screw receiving area is closed. Earth which has been removed, therefore, does not slide directly past the screw receiving area and the screw guided therein. As a result, the wear of the screw, by which the cultivator is fastened to the support, may be significantly reduced. The screw head is advantageously not positioned in a recess of the screw receiving area and thus is not able to be covered by removed earth. A tool receiver of the screw head, therefore, is able to be reached at any time by a suitable tool and the screw connection released. Preferably, the cultivator bears with its support surface against a mounting surface of the support facing in the tool advancing direction. Corresponding to the at least one screw receiving area, therefore, at least one mounting bore is incorporated in the support as a through-bore. The screw, therefore, may be guided in the tool advancing direction through the mounting bore of the support and screwed into the screw receiving area of the cultivator. As a result, a screw connection which is able to be subjected to high levels of mechanical stress is achieved between the support and the cultivator. The screw head is arranged downstream of the cultivator and the support in the tool advancing direction, so as to be protected from earth sliding past.

The design of the screw receiving area being continuously covered in the tool advancing direction by at least one wear protection element may be produced in a simple and cost-effective manner. By means of the wear protection element with its high level of wear resistance, the screw receiving area is continuously closed during the life expectancy of the cultivator.

Moreover, the screw receiving area which is designed as a blind hole may be advantageously provided in regions of the cultivator which are not covered by wear protection elements in the tool advancing direction, wherein the continuously closed front face of the cultivator is maintained. If wear protection elements are arranged in the region of the screw receiving area, by the screw receiving areas being designed as blind holes it is advantageously ensured that no solder, adhesive or any other fastening material by a material connection, such as is used for fastening wear protection elements to the base part of the cultivator, enters the screw receiving area and wears the inner thread provided therein.

In both embodiments, the cultivator forms a closed surface in the tool advancing direction, the removed earth being able to slide easily past the closed surface. Deflectors or the like, in order to conduct the earth past specific regions of the cultivator, are not required.

In order to obtain a particularly resistant front face of the cultivator, it may be provided that the front face of the cultivator, which is aligned in the tool advancing direction (V), is at least partially covered by wear protection elements, that at least one of the wear protection elements extends as far as the cutting element and that the wear protection elements are arranged as far as the region of at least one screw receiving area. Advantageously, the wear protection elements are arranged in regions which are subjected to high levels of mechanical stress. As one of the wear protection elements extends as far as the cutting element, the region of the cultivator immediately after the cutting element, which is subjected to high levels of abrasion, is protected from wear. If the wear protection elements are guided as far as the region of the at least one screw receiving area which is designed as a blind hole, for example, it is possible to prevent the base part from being worn in this region and as a result the screw receiving area, which was initially closed in the tool advancing direction, from being exposed. Advantageously, the entire region of the cutting element as far as the at least one screw receiving area is covered by wear protection elements, whereby a continuous protection of the regions of the cultivator which are subjected to particularly high levels of mechanical stress may be achieved.

In order to avoid stress peaks in the region of the at least one screw receiving area, it may be provided that the screw receiving area, which is designed as a blind hole, is rounded at its internal end or that the transitions between the internal surfaces of the screw receiving area, which is designed as a blind hole, are rounded. Due to the cutting element cutting into the soil and the cultivator in its front region projecting over the support arranged on the rear face, the surface of the cultivator facing in the tool advancing direction is at least partially under tensile stress. At the internal end of the screw receiving area the remaining material thickness of the base part is at its smallest, so that here the greatest mechanical stresses occur. By means of the rounded surfaces the risk of fracture of the cultivator may be reduced in this region.

During use, the cultivator is subjected to high forces and vibrations. In order to prevent the screw connection with the support from being released and the cultivator from becoming mislaid, it may be provided that the thread of the screw receiving area is configured in order to form a self-locking screw connection with a screw.

In order to avoid deformation or a fracture of the base part during use of the cultivator, and in order to permit a screw receiving area with a sufficient depth and thus a secure screw connection between the support and the cultivator, it may be provided that the thickness of the base part in the region of the at least one screw receiving area, measured in the direction of the longitudinal extent of the at least one screw receiving area, is between 5 mm and 120 mm, preferably between 9 mm and 35 mm.

During use of the cultivator, the main forces act on the cutting element counter to the tool advancing direction. The support element terminates upstream of the cutter support of the base part, the cutting element being fastened thereto. The base part in this region, therefore, is no longer supported from the rear by the support. This leads to high tensile stresses on the front face of the cultivator, as already set forth. By a suitable positioning of the at least one screw connection, a deflection of the base part and thus the formation of stresses which are too high in the region of the surface of the cultivator may be avoided. Advantageously, to this end it may be provided that the spacing of the at least one screw receiving area upstream in the tool advancing direction (V) relative to a cutter of the cutting element ranges between 10 mm and 350 mm. With larger spacings between the screw receiving area and the cutting element, due to the occurrence of vibrations during operation, a lateral support of the ploughshare body on the plow beam should be implemented (retaining webs/raised supports).

According to a preferred embodiment of the present invention, it may be provided that two screw receiving areas are provided in the base part and that the spacing between the screw receiving areas ranges between 20 mm and 500 mm. By the mounting of the cultivator on the support via two screw connections, a connection of the components which is able to be subjected to high mechanical stresses may be achieved. By the selected spacing between the two screw receiving areas, the deflection of the cultivator during use may be kept very low.

A cultivator according to the present invention may be designed such that the screw receiving area which is designed as a through-bore, or the region below which the screw receiving area which is designed as a blind hole terminates, is entirely covered toward the front face of the cultivator by an individual wear protection element, where the dimensions of the wear protection element covering the screw receiving area, measured in the plane of the front face of the base part, are selected such that the wear protection element at least in its fastening region protrudes over the edge of the screw receiving area projected into the plane of the front face, in particular such that the wear protection element protrudes over the periphery of the edge of the screw receiving area projected into the plane of the front face, by at least 1 mm. Advantageously, therefore, a gap, as is present between two wear protection elements, is not arranged above the region of the screw receiving areas. As a result, stress peaks which may occur between two wear protection elements may be avoided in the region of the at least one screw receiving area. By a projection of the wear protection element by 2 mm over the edge, or the edge of the screw receiving area projecting over the front face, even with a screw receiving area designed as a through-bore a sufficiently large support surface is formed on the periphery, the wear protection element with the base part of the cultivator being able to be soldered, adhesively bonded or otherwise connected thereto by a material connection.

The object of the present invention relating to the tool system is achieved by the screw receiving area being designed as a blind hole with an inner thread and being recessed into a support surface of the cultivator aligned opposite the tool advancing direction of the cultivator, or by the screw receiving area being designed as a through-bore with an inner thread and being covered in the tool advancing direction by at least one wear protection element and by the cultivator being retained by at least one screw on the support, the screw being guided from the side of the support located opposite the tool advancing direction (V) through the at least one mounting bore and being screwed into the screw receiving area. The screw and the screw receiving area are thus only accessible from the rear face of the tool system relative to the tool advancing direction. Thus, in particular, the screw and the screw head are arranged so as to be protected from earth sliding past. The front face of the cultivator facing in the tool advancing direction may be designed to be continuous. Application points for increased wear are thus avoided. By the protected arrangement of the screw, premature wear thereof may be avoided. As a result, a longer service life of the tool system is achieved. At the same time, damage to a tool receiver on the screw head of the screw by the earth sliding past may be avoided. The screw connection may, therefore, be easily released even after a long period of use.

If it is provided that when the tool system is mounted the at least one screw terminates at a distance from an internal end of the screw receiving area which is designed as a blind hole, or at a distance from the wear protection element which covers the screw receiving area which is designed as a through-bore, the cultivator may be securely fastened with its support surface onto the support by the screw connection, even with greater thickness tolerances of the components. The cultivator thus bears securely against the support on the rear face and is able to transmit forces acting on its front face to the support.

Advantageously, the tool system comprises a previously described cultivator.

BRIEF DESCRIPTION OF THE DRAWINGS

The present invention is described in more detail hereinafter with reference to an exemplary embodiment shown in the drawings.

DETAILED DESCRIPTION OF THE INVENTION

Figure 1:
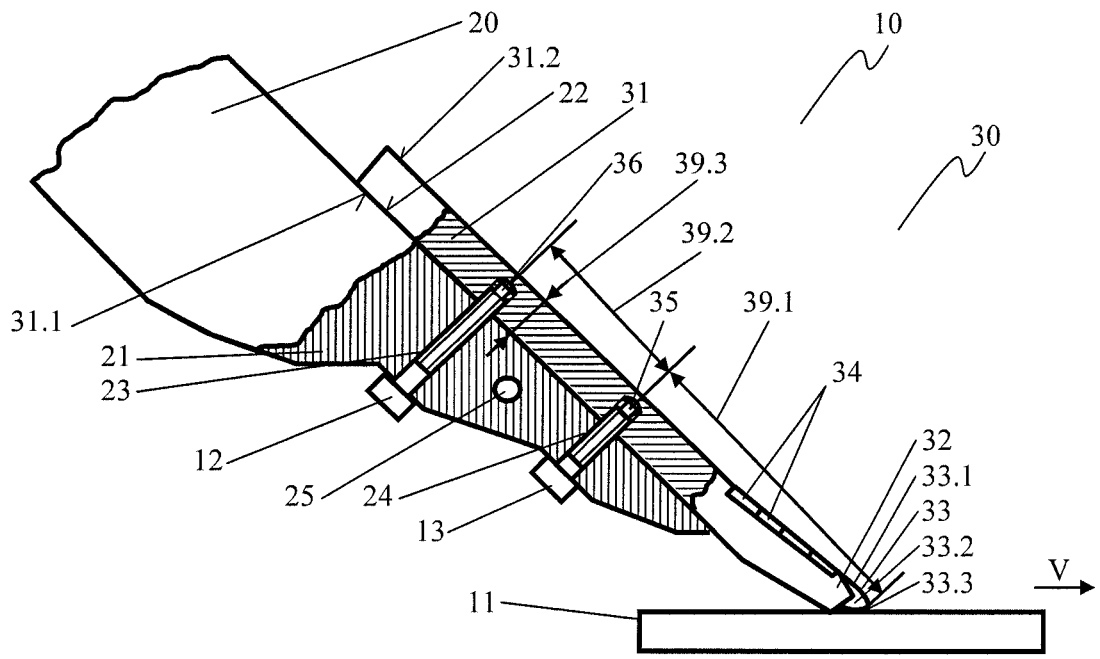
FIG. 1 shows in a lateral view, shown partially in section, a tool system with a cultivator and a support.

FIG. 1 shows in a lateral view, shown partially in section, a tool system 10 with a cultivator 30 and a support 20. The cultivator 30 preferably has a forged base part 31. Toward the soil 11 to be plowed, the base part 31 terminates in a cutter support 32. A cutting element 33 is fastened to the cutter support 32. The cutting element 33 is produced from a hard material, preferably a hard metal. The cutting element is secured by a fastening portion 33.1 to a surface of the base part 31 facing in a tool advancing direction V of the cultivator 30, preferably soldered, adhesively bonded or welded or otherwise connected thereto by a material connection. Bent back from the fastening portion 33.1 and aligned counter to the tool advancing direction V of the tool system 10, an attachment piece 33.2 is formed on the fastening portion 33.1 of the cutting element 33. Toward the cutter support 32, the fastening portion 33.1 and the adjacent attachment piece 33.22 form surfaces which are located at an angle to one another and which comprise the front edge of the cutter support 32. Toward the soil, the cutting element 33 terminates in a cutter 33.3 which is designed in the present case to be rounded. Preferably, the attachment part 33.2 is also connected, in particular soldered, to the cutter support 32.

Adjacent to the fastening portion 33.1 of the cutting element 33 a front face 31.2 of the cultivator 30 is formed by wear protection elements 34. To this end, wear protection elements 34 are connected to the surface of the base part 31 aligned in the tool advancing direction V, in particular soldered, adhesively bonded or otherwise connected thereto by a material connection. In the present case, the wear protection elements 34 are designed to be cuboidal. Thus they form a step-free surface facing in the tool advancing direction V. Earth may be guided past the surface without great resistance when the cultivator 30 is pulled through the soil 11.

Opposite the front face 31.2 of the cultivator 30 the base part 31 is defined by a support surface 31.1. The cultivator 30 with the support surface 31.1 bears against a mounting surface 22 of the support 20. The support 20 on the rear face supports the portion of the base body 31 remote from the soil 11. Only the front region of the base part 31 with the cutter support 32 protrudes beyond the support 20. On the front face, the wear protection elements 34 are guided as far as the region of the base part 31 which is supported on the rear face by the support 20.

The support 20 is connected, not shown, to a soil processing machine. A mounting region 21 is provided on an end region of the support 20 facing the soil 11, the mounting region forming the mounting surface 22 in the tool advancing direction V. Preferably, the support 20 is of rectangular configuration, wherein the side lengths of the rectangle in the mounting region 21 facing in the tool advancing direction V, are reduced in a stepwise manner. In this case oblique portions are provided between the steps. In the mounting region 21 mounting bores 23, 24 are guided through the support 20. The mounting bores 23, 24 in this case extend from a rear face of the support 20, relative to the tool advancing direction V, to the mounting surface 22 thereof. Preferably, the mounting bores 23, 24 are aligned parallel to the surface normal of the mounting surface 22. In the exemplary embodiment shown, the mounting bores 23, 24 are guided on the rear face, starting from the regions of the steps through the mounting region 21. The steps in this case extend at least approximately parallel to the mounting surface 22. In the present case, two mounting bores 23, 24 are provided. However, embodiments with one mounting bore 23, 24 or with more than two mounting bores 23, 24 are also conceivable. Between the mounting bores 23, 24, the support 20 is penetrated by a transverse bore 25. This bore serves as a potential fastening for plowshares, not shown, on the support 20.

Corresponding to the mounting bores 23, 24, a first and a second screw receiving area 35, 36 are incorporated in the base part 31 of the cultivator 30. The screw receiving areas are aligned, starting from the support surface 31.1, toward the front face 31.2 of the cultivator 30. The first and the second screw receiving areas 35, 36 are designed as blind holes and thus are not passed through as far as the front face 31.2. The first and second screw receiving areas have in each case an inner thread. Preferably an inner thread M12 is provided. Two screws 12, 13 for the cultivator 30 are guided through the mounting bores 23, 24 and screwed into the first and second screw receiving areas 35, 36. The screw heads of the screws 12, 13 bear against the rear face of the support 20. The cultivator 30 is connected by the screws 12, 13 to the support 20.

The first screw receiving area 35 is spaced apart by a first spacing 39.1 from the cutter 33.3 of the cutting element 33, as is shown by a double arrow. A second spacing which is also marked by a double arrow 39.2 separates the first screw receiving area 35 from the second screw receiving area 36. A thickness 39.3 of the base part 31 in the region of the first and the second screw receiving areas 35, 36 is also identified by a double arrow.

The design of the first and second screw receiving areas 35, 36 as blind holes, formed in the base part 31 in the tool advancing direction V, permits a continuously closed front face 31.2 of the cultivator 30. No screw holes which are incorporated in the base part from the front face 31.2, with screws or deflectors arranged therein, are required, the earth being specifically deflected thereby past the screw holes. As a result, a lower resistance is provided to the earth sliding past. At the same time the front face 31.2 provides only a few application points relative to the earth, whereby the wear of the cultivator may be significantly reduced. The screw heads of the screws 12, 13 are arranged on the rear face of the support 20 relative to the tool advancing direction V. The screw heads are, therefore, protected both by the cultivator 30 and by the support 20 relative to the earth flowing past. The wear of the screws 12, 13 and, in particular, the screw heads is thus able to be kept sufficiently low. It is also conceivable, but no longer required, to arrange the screw heads in recesses of the mounting bores 23, 24. Therefore, earth is not able to be deposited in the recessed holes above the screw heads. The screw heads with the tool receivers attached thereto are, therefore, easily accessible even after lengthy use of the tool system 10. Due to the low wear, tool receivers formed on the screw heads also remain ready for use. Thus a simple replacement of the cultivator 30 is possible.

In the arrangement according to FIG. 1, the front region of the base part 31 in the tool advancing direction V is covered by wear protection elements 34. The wear protection elements 34 are preferably produced from a hard material, in particular a hard metal. However, other hard materials such as for example ceramics, other sintered materials or diamond-based materials may also be used. An additional hard material coating of the wear protection elements 34, for example, using polycrystalline diamond, is also conceivable. By means of the wear protection elements 34, the front region of the base part 31 which is particularly subject to mechanical stress is covered and protected from wear. In this case, the wear protection elements are guided into the region of the base part 31 which is supported by the support 20 on the rear face. As a result, it is possible to prevent the front region of the base part 31, which is not supported by the support 20, from becoming thinner due to wear and as a result fracturing during plowing.

A lever is formed by the region of the cultivator 30 located in the direction of the soil 11 above the support 20. Forces acting in this region lead to a torque transmitted to the cultivator 30. This may have the result that the screw connections are subjected to tensile load. The screw connections, therefore, are designed such that they are also able to absorb high tensile forces. For example, screws 12, 13 of the size M12 may be used which are able to be sufficiently load-bearing in order to absorb the tensile forces present. The thickness 39.3 of the base part 31 is designed in the region of the screw receiving areas 35, 36 such that the screws 12, 13 are able to be sufficiently deeply screwed in. Therefore, the thickness should be at least 5 mm preferably 9 mm. In the present case, a base part 31 with a thickness 39.3 of 28 mm is provided. Thus it is ensured that sufficient material of the base part 31 remains in the extension of the screw receiving areas 35, 36 in order to keep the screw receiving areas 36, 36 closed, even in the case of continuing wear of the front face 31.2 in this region. Moreover, the material thickness which is thus ensured prevents a fracture of the base part 31 due to tensile stresses which may be formed by the aforementioned formation of a lever in the region of the surface of the base part facing in the tool advancing direction V. Advantageously, the terminal ends of the first and second screw receiving areas 35, 36 are rounded. Stress peaks due to the tensile forces and forces introduced into the internal surfaces of the screw receiving areas 35, 26 may be thus avoided or at least reduced.

By the use of two screw connections, the cultivator 30 may be prevented from rotating about an axis formed by the screw connection without additional measures. Moreover, deflections of the base part 31 may be substantially avoided. As a result, the risk of fracture for the cultivator 30 may be reduced. In order to be able to absorb the acting forces in a reliable manner, preferably the second spacing 39.2 is provided between the first and the second screw receiving areas 35, 36 so as to range between 20 mm and 500 mm. In order to keep the deflection of the front region of the cultivator 30 at a low level, preferably the spacing between the first screw receiving area 35 and the cutter 33 is provided to range between 20 mm and 300 mm.

Figure 2:
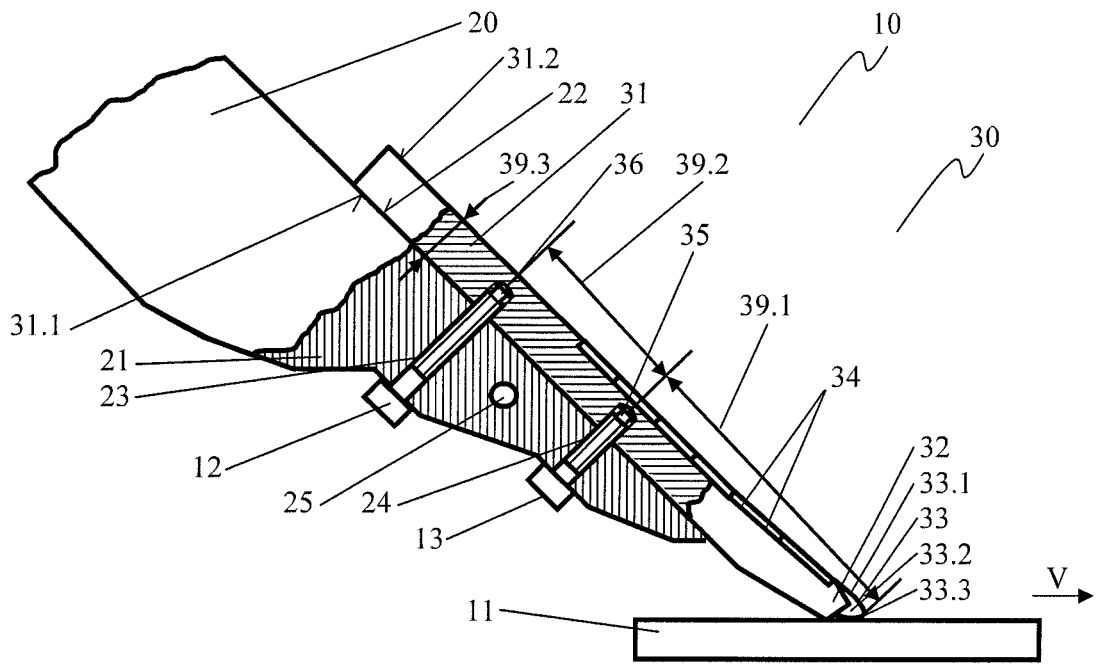
FIG. 2 shows a tool system in a view corresponding to FIG. 1 with a widened region, covered by wear protection elements, of a base part of the cultivator.

FIG. 2 shows the tool system 10 in a view corresponding to FIG. 1 with a greater region of the base part 31 of the cultivator 30 covered by means of the wear protection elements 34. The same components are denoted in this case as set forth relative to FIG. 1.

The first and the second screw receiving areas 35, 36 are also designed here as blind holes. Proceeding from the fastening portion 33.1 of the cutting element 33, the surface of the base part 31 facing in the tool advancing direction V is covered by wear protection elements 34, as already described in their function and in their construction relative to FIG. 1, as far as the region of the first screw receiving area 35. As a result, a high degree of wear of the base part (31) in the region of the first screw receiving area 35 which is still subjected to high mechanical stress, may be avoided. Thus it is possible to prevent the first screw receiving area 35 from being opened as a result of wear toward the front face 31.2 of the cultivator 30. In addition, it is possible to prevent the remaining material thickness at the end of the first screw receiving area 35 from being sufficiently reduced that it ultimately develops into a potential fracture when subjected to stress.

Figure 3:
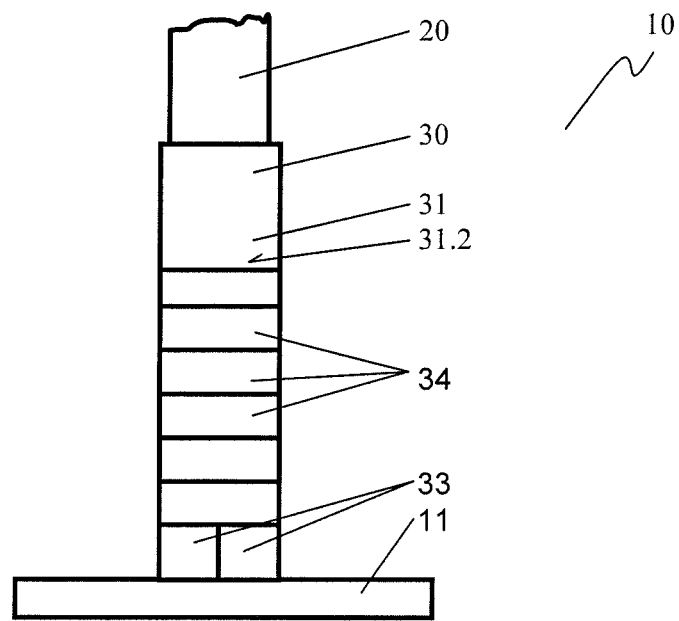
FIG. 3 shows the tool system shown in FIG. 2 in a view from the front.

FIG. 3 shows the tool system 10 shown in FIG. 2, in a view from the front. The front face 31.2 of the cultivator 30 is closed continuously, i.e. configured without bores. As a result, wear of the bores or screw parts arranged therein may be avoided. The wear protection elements 34 produced from hard material cover the front surface of the base part 31 as far as the region of the first screw receiving area 35 shown in FIG. 2. Thus the entire region of the base part 31 facing the soil 11 is protected from wear in the tool advancing direction V. The cultivator 30 protrudes laterally over the support 20. Removed earth is thus guided past the support 20. It is conceivable to protect the support 20 additionally from wear in the region adjoining the cultivator 30 by a guide element which is connected to the support 20 and not shown.

Two cutting elements 33 arranged adjacent to one another are provided in the direction of the soil 11. By the segmentation of the cutting elements 33, smaller and thus more fracture-resistant cutting elements 33 are obtained. Cracks are not able to be transmitted from one segment to another. Also the front face 31.2 of the cultivator 30 is formed by a plurality of wear protection elements 34. The use of a plurality of wear protection elements 34 arranged in series also has the advantage of a reduced risk of fracture and a prevention of crack propagation between the elements.

Figure 4:
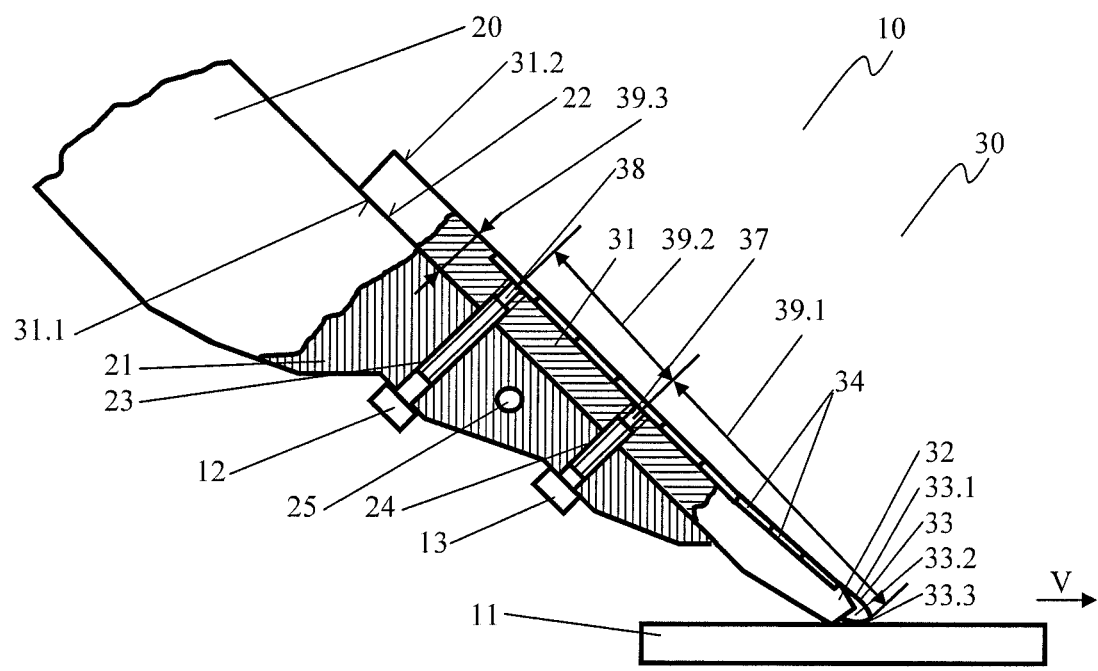
FIG. 4 shows a tool system in a view corresponding to FIG. 2 with an alternative embodiment of screw receiving areas arranged in the base part.

FIG. 4 shows the tool system 10 in a view according to FIG. 2 with an alternative embodiment of the third and fourth screw receiving areas 37, 38 arranged in the base part 31. The same components are denoted and designed in the same manner as set forth above.

In contrast to the embodiments shown in FIGS. 1 and 2, the third and fourth screw receiving areas 37, 38 are designed as through-bores through the base part 31. In the tool advancing direction V the third and fourth screw receiving areas 37, 38 are covered by wear protection elements 34. The wear protection elements 34, in this case starting from the cutting element 33 as far as the region of the fourth screw receiving area 38 furthest away from the cutting element 33, are arranged on the surface of the base part 31 facing in the tool advancing direction V of the tool system 10. The front face 31.2 of the cultivator 30 is, therefore, substantially protected from wear.

Figure 5:
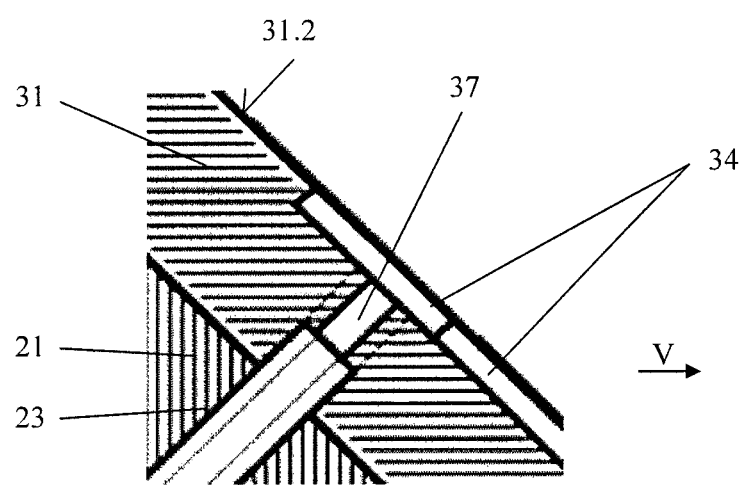
FIG. 5 shows a detail of the tool system shown in FIG. 4 in the region of a fourth screw receiving area.

FIG. 5 shows a detail of the tool system 10 shown in FIG. 4 in the region of the fourth screw receiving area 38. By means of the wear protection elements 34 the fourth screw receiving area 38 is closed in the tool advancing direction V. As a result, earth is prevented from penetrating into the fourth screw receiving area 38. Wear of the first screw 12 or the fourth screw receiving area 38, shown in FIG. 4, may be prevented thereby. Advantageously the fourth screw receiving area 38 and also the third screw receiving area 38 shown in FIG. 4, are covered in each case by a single wear protection element 34. The respective wear protection element 34 in this case is dimensioned such that it protrudes over the periphery of the edge of the third and fourth screw receiving areas 38. By this arrangement, the wear protection element 34 is connected over the periphery of the first and second screw receiving areas 38 to the surface of the base part 31 facing in the tool advancing direction V, in particular soldered. As a result, it may be ensured that no foreign material enters the third or fourth screw receiving areas 37, 38. Advantageously no transitions are arranged between two wear protection elements 34 in the region of the third and fourth screw receiving areas 37, 38. Stress peaks are thus able to be avoided in the region of the base part 31 which is already weakened by the screw receiving areas 37, 38. For this reason it is advantageous, even with the first and second screw receiving areas 35, 36 designed as blind holes as shown in FIGS. 1 and 2, to arrange and to dimension the wear protection elements 34 such that in each case only one wear protection element 34 covers the projection of the first and second screw receiving areas 35, 36 in the direction of its longitudinal extent on the surface of the base part 31 facing in the tool advancing direction V. Advantageously, the respective wear protection element 34 in each case protrudes at least by 1 mm over the edge and/or the projection of the edge of the associated screw receiving area 35, 36, 37, 38. As a result, a sufficiently large contact surface is formed for the arrangement of the soldering.

By the arrangements shown, a closed front face 31.2 of the cultivator 30, which is at least partially formed by wear protection elements 34, may be achieved. This provides no application points relative to the earth sliding past, whereby the wear of the cultivator 30 is reduced. It is conceivable to form channels or the like in the front face 31.2 of the cultivator 30 which is not formed, in particular, by wear protection elements 34, into the surface of the base part 31. Earth may be deposited into the channels. Earth which is guided past thus slides past the deposited earth and does not come into contact with the surface of the base part 31. As a result, the wear of the front face 31.2 of the cultivator 30 may be reduced in the regions not covered by wear protection elements 34. The screws 12, 13 are guided, starting from the rear face through the support 20 toward the cultivator 30.

The earth removed by the cultivator 30 is guided by the cultivator 30 and the support 20 past the screws 12, 13 and, in particular, the screw heads thereof. The wear of the screws 12, 13 and the screw heads with the tool receivers formed thereon is thus very low. Thus even after a lengthy period of operation, a suitable tool may be securely positioned on the screws 12, 13 and said screws may be opened.

The invention claimed is:

1. A cultivator attached to an agricultural soil processing machine support portion, the cultivator comprising: a base part having at least an inner surface, an outer surface, a proximal end, a distal end and a first length between the proximal end and the distal end, a cutter support defined on the distal end of the base part, a cutting element connected to the cutter support, at least a first wear protection element having a second length less than the first length provided on the outer surface of the base part intermediate the proximal end and the distal end thereof, at least a second wear protection element having the second length defined on an outer surface of the cutting element spaced away from the at least the first wear protection element, and at least one screw receiving area defined in the base part, whereby the base part is attached to the agricultural processing machine support portion,
wherein the at least one screw receiving area includes an inner thread and is recessed into the inner surface of the base part along a direction toward the outer surface of the base part.

2. The cultivator as claimed in claim 1, wherein a front face of the cultivator, which is aligned in the tool advancing direction, is at least partially covered by the at least one of the at least the first or the at least the second wear protection elements, wherein the at least one of the at least the first or the at least the second wear protection elements is guided as far as the cutting element and wherein the at least one of the at least the first or the at least the second wear protection elements is arranged as far as a region of the at least one screw receiving area.

3. The cultivator as claimed in claim 1, wherein the at least one screw receiving area extends to a terminal end intermediate the inner surface of the base part and the outer surface of the base part, and at least one of is rounded at the terminal end or has rounded transitions between internal surfaces thereof.

4. The cultivator as claimed in claim 1, wherein the inner thread of the at least one screw receiving area defines a self-locking screw connection with a screw.

5. The cultivator as claimed in claim 1, wherein a thickness of the base part in a region of the at least one screw receiving area, measured in a direction of a longitudinal extent of the at least one screw receiving area, is between 5 mm and 120 mm.

6. The cultivator as claimed in claim 1, wherein a spacing of the at least one screw receiving area upstream in a tool advancing direction relative to a cutter of the cutting element is between 10 mm and 350 mm.

7. The cultivator as claimed in claim 1, wherein two screw receiving areas are provided in the base part and wherein a spacing between the screw receiving areas is between 20 mm and 500 mm.

8. The cultivator as claimed in claim 1, wherein the at least one screw receiving area extends to the outer surface of the base part, and is at least partially covered on the outer surface of the base part by the at least the first wear protection element.

9. The cultivator as claimed in claim 1, wherein the support portion is a tine of the agricultural soil processing machine.

10. The cultivator as claimed in claim 5, wherein the thickness of the base part in the region of the at least one screw receiving area is between 9 mm and 35 mm.

11. The cultivator as claimed in claim 8, wherein the at least one screw receiving area is completely covered by the at least the first wear protection element on the outer surface of the base part.

12. A tool system attachable to an agricultural soil processing machine, the tool system comprising: a cultivator and a mounting region, the cultivator comprising a base part having at least an inner surface, an outer surface, a proximal end, a distal end, and a first length between the proximal end and the distal end, a cutting element arranged on a cutter support provided at the distal end, first and second wear protection elements, the first wear protection element having a second length less than the first length and being provided on an outer surface of the base part intermediate the proximal end and the distal end, the second wear protection element having the second length and being provided on an outer surface of the cutter support, and at least one screw receiving area defined in the base part aligned with at least one corresponding mounting bore defined in the mounting region, wherein the at least one screw receiving area includes an inner thread and is recessed into the inner surface of the base part extending along a direction toward the outer surface of the base part.

13. The tool system as claimed in claim 12, wherein the at least one screw receiving area extends to a terminal end intermediate the inner surface of the base part and the outer surface of the base part.

14. The tool system as claimed in claim 12, wherein the mounting region is a surface of a tine of the agricultural soil processing machine.

15. The tool system as claimed in claim 12, wherein the at least one screw receiving area extends to the outer surface of the base part, and is at least partially covered on the outer surface of the base part by at least one of the first and second wear protection elements.

16. The tool system as claimed in claim 15, wherein the at least one screw receiving area is completely covered by the at least one of the first and second wear protection elements on the outer surface of the base part.

17. The tool system according to claim 12, further comprising at least a third wear protection element defined on an outer surface of the cutting element.

\* \* \* \* \*